United States Patent
Asai

(10) Patent No.: US 10,423,376 B2
(45) Date of Patent: Sep. 24, 2019

(54) INFORMATION PROCESSING APPARATUS HAVING INTERACTIVE USER INTERFACE FOR MANAGING COOPERATIVE OPERATION BETWEEN PLURAL APPARATUSES

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/754,803

(22) Filed: Jun. 30, 2015

(65) Prior Publication Data

US 2015/0378644 A1 Dec. 31, 2015

(30) Foreign Application Priority Data

Jun. 30, 2014 (JP) .................................. 2014-134920

(51) Int. Cl.
  *G06F 3/12* (2006.01)
  *H04N 1/00* (2006.01)

(52) U.S. Cl.
  CPC .......... *G06F 3/1286* (2013.01); *G06F 3/1211* (2013.01); *G06F 3/1275* (2013.01); *G06F 3/1292* (2013.01); *H04N 1/00127* (2013.01); *H04N 1/00307* (2013.01)

(58) Field of Classification Search
  None
  See application file for complete search history.

(56) References Cited

U.S. PATENT DOCUMENTS

| 4,991,972 A | 2/1991 | Ikenoue et al. |
| 6,553,431 B1* | 4/2003 | Yamamoto ......... H04N 1/32502 358/1.13 |
| 6,609,162 B1* | 8/2003 | Shimizu .................. H04L 41/00 709/203 |
| 7,002,702 B1* | 2/2006 | Machida ............ H04N 1/00416 358/1.13 |
| 8,019,853 B2 | 9/2011 | Machida |

(Continued)

FOREIGN PATENT DOCUMENTS

| JP | 2000-187573 A | 7/2000 |
| JP | 2000-315182 A | 11/2000 |

(Continued)

OTHER PUBLICATIONS

Aug. 26, 2015—U.S. Notice of Allowance—U.S. Appl. No. 14/489,133.

(Continued)

*Primary Examiner* — Mohammad H Ghayour
*Assistant Examiner* — Pawandeep Dhingra
(74) *Attorney, Agent, or Firm* — Banner & Witcoff, Ltd.

(57) ABSTRACT

A cooperation system and a program for operating a plurality of apparatuses in cooperation is provided. The program is capable of implementing a user interface for easily adding a necessary operation while one or more first apparatuses and one or more second apparatuses are involved in a cooperation operation, wherein a necessary operation can be added to the cooperation operation at least until the reception of the target data from all the first apparatuses is completed.

12 Claims, 11 Drawing Sheets

(56) References Cited

U.S. PATENT DOCUMENTS

| | | | | |
|---|---|---|---|---|
| 2002/0184499 | A1* | 12/2002 | Taguchi | G06F 8/61 713/168 |
| 2005/0055641 | A1* | 3/2005 | Machida | H04L 41/22 715/734 |
| 2005/0243365 | A1* | 11/2005 | Noda | G06F 3/1262 358/1.15 |
| 2009/0103124 | A1* | 4/2009 | Kimura | G06F 3/1204 358/1.15 |
| 2009/0190162 | A1 | 7/2009 | Kohama et al. | |
| 2013/0335765 | A1 | 12/2013 | Ishiguro | |
| 2014/0268208 | A1* | 9/2014 | Hirakata | H04N 1/00875 358/1.14 |
| 2014/0280445 | A1* | 9/2014 | Hori | G06Q 10/06 709/201 |
| 2014/0376045 | A1* | 12/2014 | Oyoshi | H04N 1/32128 358/1.15 |
| 2015/0077781 | A1* | 3/2015 | Asai | H04N 1/00915 358/1.13 |
| 2015/0207942 | A1* | 7/2015 | Bakthavachalu | H04N 1/00307 358/1.15 |

FOREIGN PATENT DOCUMENTS

| | | |
|---|---|---|
| JP | 2004-288052 A | 10/2004 |
| JP | 2004-320621 A | 11/2004 |
| JP | 3787434 B2 | 6/2006 |
| JP | 2009187529 A | 8/2009 |
| JP | 2013-255027 A | 12/2013 |
| JP | 2014003413 A | 1/2014 |

OTHER PUBLICATIONS

May 12, 2015—U.S. Non-Final Office Action—U.S. Appl. No. 14/489,133.
Jun. 30, 2015—Co-pending U.S. Appl. No. 14/754,872.
Feb. 26, 2016—U.S. Non-Final Office Action—U.S. Appl. No. 14/754,872.
Oct. 21, 2016—U.S. Notice of Allowance—U.S. Appl. No. 14/754,872.
Jan. 9, 2018—(JP) Office Action—App 2014-134917, Partial Eng Tran.
Jun. 21, 2019—(JP) Notification of Reasons for Refusal—App 2018-134786, partial Eng Tran.

* cited by examiner

FIG. 8A

| EXECUTION SEQUENCE | APPARATUS ID | OPERATION CONTENT | PROGRESSING STATUS |
|---|---|---|---|
| 1 | SERVER A | DL | UNDER OPERATION |
| 2 | MFC-A | SCAN | OPERATION STANDBY |
| 3 | MFC-C | PRINT | OPERATION STANDBY |

FIG. 8B

| EXECUTION SEQUENCE | APPARATUS ID | OPERATION CONTENT | PROGRESSING STATUS |
|---|---|---|---|
| 1 | SERVER A | DL | UNDER OPERATION |
| 2 | MFC-A | SCAN | OPERATION STANDBY |
| 3 | MFC-B | SCAN | OPERATION STANDBY |
| 4 | MFC-C | PRINT | OPERATION STANDBY |

FIG. 9A

| APPARATUS ID | OPERATION CONTENT |
|---|---|
| SERVER A | DL |
| MCF-A | SCAN |
| MCF-B | SCAN |
| MCF-C | SCAN |

FIG. 9B

| APPARATUS ID | OPERATION CONTENT |
|---|---|
| SERVER A | UL |
| MCF-A | PRINT |
| MCF-B | PRINT |
| MCF-C | PRINT |

INFORMATION PROCESSING APPARATUS HAVING INTERACTIVE USER INTERFACE FOR MANAGING COOPERATIVE OPERATION BETWEEN PLURAL APPARATUSES

CROSS-REFERENCE TO RELATED APPLICATION

This application claims priorities from Japanese Patent Application No. 2014-134920 filed on Jun. 30, 2014, the entire subject matters of which is incorporated herein by reference.

TECHNICAL FIELD

The present disclosure relates to a computer program for operating a plurality of apparatuses in cooperation with each other.

BACKGROUND

In the related art, an information processing apparatus has been known which is configured to operate (hereinafter, referred to as 'cooperation operation') one or more input apparatuses and one or more output apparatuses selected from a plurality of devices connected to a network in cooperation with each other. The information processing apparatus is configured to download target data from a storage server, which is an example of the input apparatus, and to enable a printer, which is an example of the output apparatus, to record an image represented by the target data on a recording sheet. An example of such apparatus is disclosed in JP-A-2000-187573.

In the cooperation operation in which a plurality of apparatuses is involved, the cooperation operation may start at a state where a necessary operation is not selected. In this case, if the cooperation operation under execution is stopped, a necessary operation is selected and the cooperation operation is again executed from the beginning, a throughput of the cooperation operation may be remarkably decreased.

SUMMARY

The present disclosure has been made in view of the above circumstances, and one of the objects of the present disclosure is to provide a program capable of implementing a user interface for easily adding a necessary operation while one or more first apparatuses and one or more second apparatuses are involved in a cooperation operation.

According to an illustrative embodiment of the present disclosure, there is provided a non-transitory computer-readable recording medium storing computer-readable instructions for an information processing apparatus including a display, a processor, a user interface that receives an operation by a user, and a communication interface that communicates with a plurality of apparatuses including a first apparatus and a second apparatus. The information processing apparatus performs a cooperation operation to instruct the first apparatus to execute a first operation and, after the first operation of the first apparatus, to instruct the second apparatus to execute a second operation, the first operation of the first apparatus including transmitting target data to the information processing apparatus, the second operation of the second apparatus including receiving the target data from the information processing apparatus. The computer-readable instructions, when executed by the processor, cause the information processing apparatus to perform: receiving a start instruction by the user through the user interface; acquiring cooperation operation information including a plurality of pieces of operation information, each of the pieces of operation information indicating an apparatus selected from the apparatuses including the first apparatus and the second apparatus and an operation to be executed by the selected apparatus, and execution sequence of each of the operations indicated by each pieces of the operation information; transmitting, when determined that the start instruction is received, a plurality of pieces of operation instruction information through the communication interface to each of the apparatuses according to the execution sequence of each of the operations included in the cooperation operation information, each pieces of the operation instruction information corresponding to each pieces of the operation information and instructing the selected apparatus to execute the operation indicated by each pieces of the operation information; controlling the display to display a status screen including status images and an adding instruction object, each of the status images representing progressing statuses of the operations to be executed by the first apparatus and the second apparatus, the adding instruction object being displayed to be selectable for receiving an adding instruction to add a new operation to be executed by the apparatuses to the cooperation operation; receiving the adding instruction by the user through the user interface by accepting the selection of the adding instruction object; and adding, when determined that the adding instruction is received, added operation information to the cooperation operation information, the added operation information indicating an added apparatus and an added operation to be executed by the added apparatus. In adding the added operation information to the cooperation operation information, the computer-readable program causes the information processing apparatus to perform: determining whether the added operation belongs to the first operation or to the second operation; adding the added operation information to the cooperation operation information to be executed after the first operation under execution and before the second operation when determined that the added operation belongs to the first operation, and adding the added operation information to the cooperation operation information to be executed after the first operation and after the second operation under execution when determined that the added operation belongs to the second operation; and transmitting, to the added apparatus through the communication interface, the operation instruction information instructing the added apparatus to execute the added operation in the execution sequence indicated by the cooperation operation information to which the added operation information is added. In controlling the display to display the status screen, the computer-readable program causes the information processing apparatus to perform: controlling the display to display the adding instruction object in the status screen to be selectable during a time period at least until a reception of the target data from the first apparatus is completed.

According to another illustrative embodiment of the present disclosure, there is provided an information processing apparatus including: a display; a processor; a user interface that receives an operation by a user; a communication interface that communicates with a plurality of apparatuses including a first apparatus and a second apparatus; and memory storing computer-readable instructions, when executed by the processor, causing the information processing apparatus to perform a cooperation operation to instruct the first apparatus to execute a first operation and, after the first operation of the first apparatus, to instruct the second apparatus to execute a second operation, the first operation of the first apparatus including transmitting target data to the information processing apparatus, the second operation of the second apparatus including receiving the target data from the information processing apparatus, the cooperation operation including: receiving a start instruction by the user through the user interface; acquiring cooperation operation information including a plurality of pieces of operation information, each of the pieces of operation information indicating an apparatus selected from the apparatuses including the first apparatus and the second apparatus and an operation to be executed by the selected apparatus, and execution sequence of each of the operations indicated by each pieces of the operation information; transmitting, when determined that the start instruction is received, a plurality of pieces of operation instruction information through the communication interface to each of the apparatuses according to the execution sequence of each of the operations included in the cooperation operation information, each pieces of the operation instruction information corresponding to each pieces of the operation information and instructing the selected apparatus to execute the operation indicated by each pieces of the operation information; controlling the display to display a status screen including status images and an adding instruction object, each of the status images representing progressing statuses of the operations to be executed by the first apparatus and the second apparatus, the adding instruction object being displayed to be selectable for receiving an adding instruction to add a new operation to be executed by the apparatuses to the cooperation operation; receiving the adding instruction by the user through the user interface by accepting the selection of the adding instruction object; and adding, when determined that the adding instruction is received, added operation information to the cooperation operation information, the added operation information indicating an added apparatus and an added operation to be executed by the added apparatus. In adding the added operation information to the cooperation operation information, the computer-readable program causes the information processing apparatus to perform: determining whether the added operation belongs to the first operation or to the second operation; adding the added operation information to the cooperation operation information to be executed after the first operation under execution and before the second operation when determined that the added operation belongs to the first operation, adding the added operation information to the cooperation operation information to be executed after the first operation and after the second operation under execution when determined that the added operation belongs to the second operation; and transmitting, to the added apparatus through the communication interface, the operation instruction information instructing the added apparatus to execute the added operation in the execution sequence indicated by the cooperation operation information to which the added operation information is added. In controlling the display to display the status screen, the computer-readable program causes the information processing apparatus to perform: controlling the display to display the adding instruction object in the status screen to be selectable during a time period at least until a reception of the target data from the first apparatus is completed.

According to still another illustrative embodiment of the present disclosure, there is provided a cooperation system including: a first apparatus selected from among a plurality of apparatuses; a second apparatus selected from among the apparatuses; and an information processing apparatus that controls a cooperation operation that is executed in cooperation with the first apparatus and the second apparatus. The cooperation operation includes instructions for the first apparatus to execute a first operation and, after the first operation of the first apparatus, a second apparatus to execute a second operation, the first operation of the first apparatus including transmitting target data to the information processing apparatus, the second operation of the second apparatus including receiving the target data from the information processing apparatus. The information processing apparatus includes: a display; a processor; a user interface that receives an operation by a user; a communication interface that communicates with a plurality of apparatuses including a first apparatus and a second apparatus; and memory storing computer-readable instructions, when executed by the processor, causing the information processing apparatus to perform: receiving a start instruction by the user through the user interface; acquiring cooperation operation information including a plurality of pieces of operation information, each of the pieces of operation information indicating an apparatus selected from the apparatuses including the first apparatus and the second apparatus and an operation to be executed by the selected apparatus, and an execution sequence of each of the operations indicated by each piece of the operation information; transmitting, when determined that the start instruction is received, a plurality of pieces of operation instruction information through the communication interface to each of the apparatuses according to the execution sequence of each of the operations included in the cooperation operation information, each piece of the operation instruction information corresponding to each piece of the operation information and instructing the selected apparatus to execute the operation indicated by each piece of the operation information; controlling the display to display a status screen including status images and an adding instruction object, each of the status images representing progressing statuses of the operations to be executed by the first apparatus and the second apparatus, the adding instruction object being displayed to be selectable for receiving an adding instruction to add a new operation to be executed by the apparatuses to the cooperation operation; receiving the adding instruction by the user through the user interface by accepting the selection of the adding instruction object; and adding, when determined that the adding instruction is received, added operation information to the cooperation operation information, the added operation information indicating an added apparatus and an added operation to be executed by the added apparatus. In adding added operation information to the cooperation operation information, the computer-readable program causes the information processing apparatus to perform: determining whether the added operation belongs to the first operation or to the second operation; adding the added operation information to the cooperation operation information to be executed after the first operation under execution and before the second operation when determined that the added operation belongs to the first operation, adding the added operation information to the cooperation operation information to be executed after the first operation and after the second operation under execution when determined that the added operation belongs to the second operation; transmitting, to the added apparatus through the communication interface, the operation instruction information instructing the added apparatus to execute the added operation in the execution sequence indicated by the cooperation operation information to which the added operation information is added. In controlling the display to display the status screen, the computer-readable program causes the information processing apparatus to perform: controlling the display to display the adding instruction object in the status screen to be selectable during a time period at least until a reception of the target data from the first apparatus is completed.

BRIEF DESCRIPTION OF THE DRAWINGS

In the accompanying drawings:

FIGS. 2A and 2B are schematic views illustrating a multi function device 10 and a portable device 50, wherein FIG. 2A is a block diagram of a multi function device 10, and FIG. 2B is a block diagram of a portable device 50;

FIGS. 5A and 5B illustrate display examples of a display 53, wherein FIG. 5A illustrates a cooperation operation selection screen, and FIG. 5B illustrates a cooperation operation screen;

FIGS. 6A and 6B illustrate display examples of the display 53, wherein FIG. 6A illustrates an addition destination selection screen, and FIG. 6B illustrates a first apparatus selection screen;

FIGS. 7A and 7B illustrate display examples of the display 53, wherein FIG. 7A illustrates the cooperation operation screen after a first operation is added, and FIG. 7B illustrates the addition destination selection screen in which a '+first operation' icon is hidden;

FIGS. 8A and 8B show examples of a cooperation operation list, wherein FIG. 8A corresponds to FIG. 5B, and FIG. 8B corresponds to FIG. 7A;

FIGS. 9A and 9B show examples of registered operation information, wherein FIG. 9A shows apparatus IDs of apparatuses becoming a first apparatus and operation contents, and FIG. 9B shows apparatus IDs of apparatuses becoming a second apparatus and operation contents;

FIGS. 10A and 10B illustrate display examples of the display 53 according to a first modified embodiment, wherein FIG. 10A illustrates the cooperation operation screen before reception of target data from all the first apparatuses is completed, and FIG. 10B illustrates the cooperation operation screen after the reception of target data from all the first apparatuses is completed; and FIGS. 11A-11C illustrate display examples of the display 53 according to a second modified embodiment, wherein FIG. 11A illustrates the cooperation operation screen before an operation is added, FIG. 10B illustrates the cooperation operation screen while the operation adding processing is being executed, and FIG. 10C illustrates the cooperation operation screen after the operation is added.

DETAILED DESCRIPTION

Hereinafter, an illustrative embodiment of the present disclosure will be described with reference to the drawings. According to an illustrative embodiment, which will be described later, is just an example of the present disclosure, and the illustrative embodiment of the present disclosure can be appropriately changed without changing the gist of the present disclosure.

Figure 1:
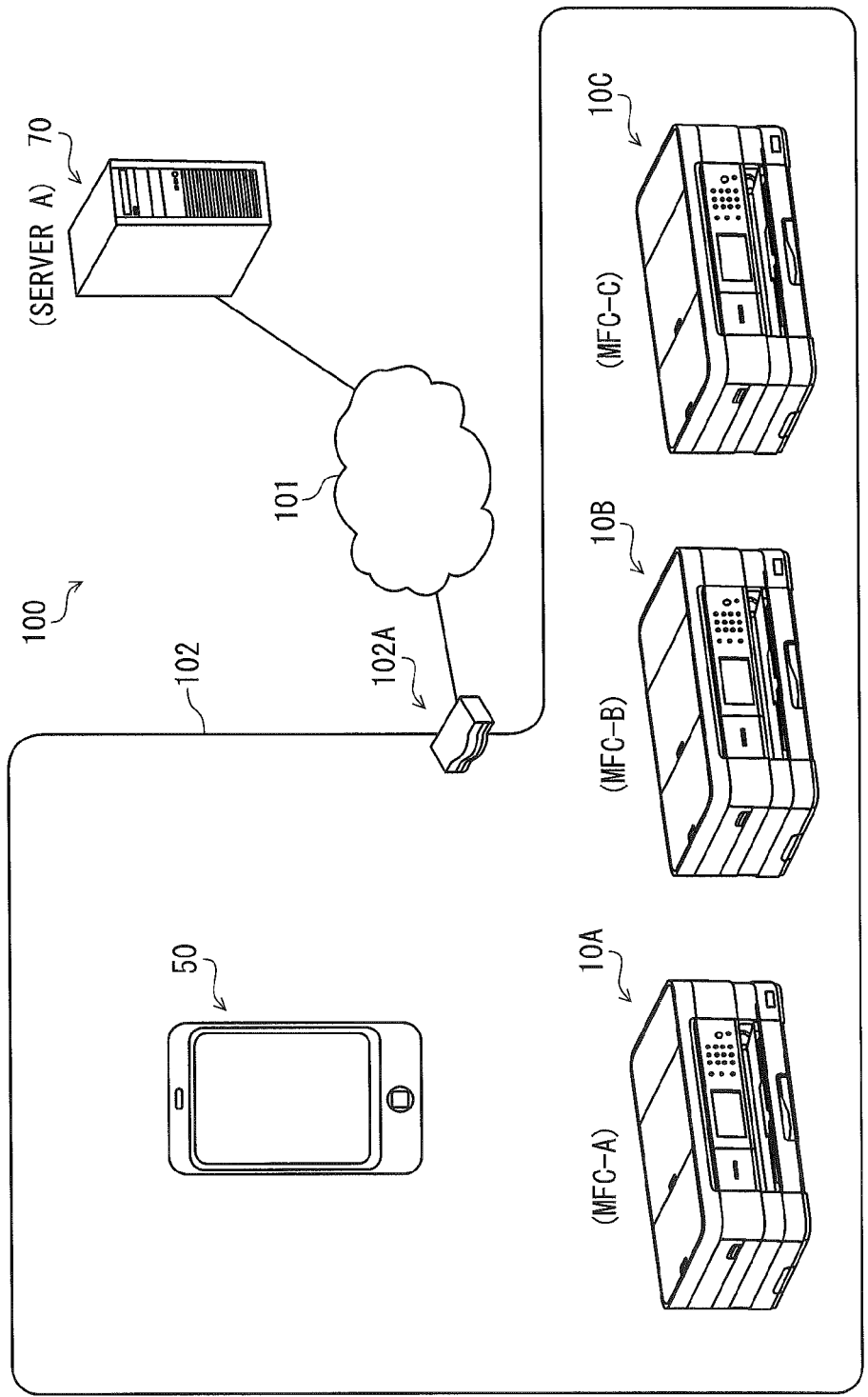
FIG. 1 is a schematic view of a cooperation system 100 of an illustrative embodiment.

FIG. 1 is a schematic view of a cooperation system 100 of an illustrative embodiment. The cooperation system 100 shown in FIG. 1 includes one or more multi function devices 10A, 10B, 10C (hereinafter, also collectively referred to as 'multi function device 10'), a portable device 50, and one or more server apparatuses 70. The multi function devices 10A, 10B, 10C, the portable device 50 and the server apparatus 70 are configured to perform communication with each other through a communication network. Although a specific example of the communication network is not particularly limited, the communication network of this illustrative embodiment includes the Internet 101, and a LAN (abbreviation of Local Area Network) 102 connected to the Internet 101.

In the example of FIG. 1, the LAN 102 is connected to the Internet 101 through a router 102A and the like. Also, the multi function device 10 and the portable device 50 belong to the LAN 102, and the server apparatus 70 is connected to the Internet 101. In this disclosure, the description 'belonging to the LAN 102' means, for example, that a setting for belonging to the LAN 102 is made for an apparatus, the apparatus can perform communication with another apparatus belonging to the LAN 102, more specifically, the apparatus is provided with a network address assigned to the LAN 102.

The multi function devices 10A, 10B, 10C and the server apparatus 70 are assigned apparatus IDs for uniquely identifying the respective apparatuses. In this illustrative embodiment, an apparatus ID of the multi function device 10A is "MFC-A", an apparatus ID of the multi function device 10B is "MFC-B", an apparatus ID of the multi function device 10C is "MFC-C", and an apparatus ID of the server apparatus 70 is "server A". The multi function devices 10A, 10B, 10C and the server apparatus 70 are examples of the plurality of apparatuses. The apparatus ID is an example of the apparatus identification information.

The apparatus included in the cooperation system 100 is not limited to the multi function device 10 and the server apparatus 70, and may be a dedicated machine such as a FAX apparatus, a printer, a 3D printer, a label printer, a sewing machine, a machine tool, a scanner, a camera and the like. In the meantime, the multi function device 10 and server apparatus 70 of the specific examples of the apparatus are examples of the apparatus that can be any of a first apparatus and a second apparatus, which will be described later. Also, the FAX apparatus, the scanner and the camera are examples of the apparatus that can be only the first apparatus. The printer, the 3D printer, the label printer, the sewing machine and the machine tool are examples of the apparatus that can be only the second apparatus.

Figure 2A:
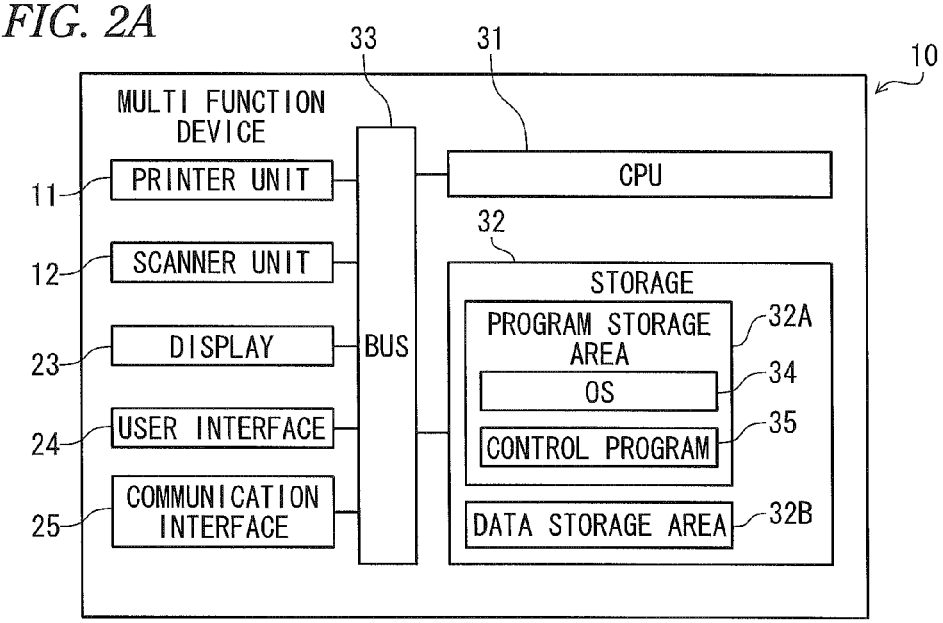

As shown in FIG. 2A, the multi function device 10 mainly has a printer unit 11, a scanner unit 12, a display 23, a user interface 24, a communication interface 25, a processor (hereinafter, also referred to as CPU) 31, a storage 32 and a communication bus 33. The respective elements configuring the multi function device 10 are connected to each other via the communication bus 33. The configurations of the multi function devices 10A, 10B, 10C may be common or may be partially different.

The printer unit 11 is configured to execute recording processing of recording an image represented by image data onto a recording sheet. Although a recording method of the printer unit 11 is not particularly limited, a well-known method such as an inkjet method and an electrophotographic method may be adopted. The scanner unit 12 is configured to execute scan processing of reading an image recorded on a recording sheet and generating image data. The multi function device 10 may further have a FAX function of transmitting and receiving facsimile data, a copy function of reading an image recorded on a recording sheet and recording the same onto another recording sheet, and the like.

The display 23 has a display screen for displaying a variety of information. Although a specific configuration of the display 23 is not particularly limited, a liquid crystal display (hereinafter, also referred to as LCD), an organic electro-luminescence display (hereinafter, also referred to as OELD) and the like may be adopted.

The user interface 24 is configured to receive a user's operation of selecting an object displayed on the display screen of the display 23. Specifically, the user interface 24 has push buttons, for example, and is configured to output a variety of operation signals associated with the pressed push buttons to the CPU 31. Further, the user interface 24 may have a film-shaped touch sensor superimposed on the display screen of the display 23. That is, the display 23 may be configured as a touch panel display. As the touch sensor, a well-known method such as an electrostatic capacitance type, a resistance film type and the like may be adopted.

Herein, the term 'object' indicates an image that can be selected by a user's operation on the user interface 24. For example, the object is a character string displayed on the display 23. When a direction key of the user interface 24 is pressed, one of the objects may be highlighted, and when an enter button of the user interface 24 is pressed, the highlighted object may be selected. As another example, when the user interface 24 is configured as a touch panel, the object may be an icon, a button, a link and the like displayed on the display 23, and the object displayed on a tap position may be selected.

The communication interface 25 is an interface for performing communication with an external apparatus through the communication network. In the illustrative embodiment, the communication interface 25 is configured to perform communication with an external apparatus, based on the TCP/IP (abbreviation of Transmission Control Protocol/Internet Protocol) protocol. That is, the multi function device 10 is configured to transmit a variety of information to the portable device 50 through the communication interface 25 and to receive a variety of data or information from the portable device 50 through the communication interface 25.

The CPU 31 is configured to control an entire operation of the multi function device 10. The CPU 31 is configured to acquire and execute a variety of programs from the storage 32, based on the variety of information output from the user interface 24 and the variety of information acquired from the external apparatus through the communication interface 25. That is, the CPU 31 and the storage 32 configure an example of the control unit. The details of the variety of programs will be described later.

The storage 32 has a program storage area 32A and a data storage area 32B. The program storage area 32A is configured to store therein an OS (abbreviation of Operating System) 34 and a control program 35. The control program 35 may be a single program or a combination of a plurality of programs. The data storage area 32B is configured to store therein data or information, which is required to execute the control program 35.

The 'data' and 'information' described in this disclosure have a common feature in that 'data' and 'information' are bits or bit string, which can be handled by a computer. The term 'data' indicates that a semantic content represented by each bit can be handled by a computer without considering the semantic content. In contrast, the term 'information' indicates that an operation of the computer is branched by a semantic content represented by each bit. Further, the term 'instruction' indicates a control signal for urging an apparatus of a transmission destination to perform a next operation, and may include the information or may have a property as the information.

Also, the 'data' and 'information' are handled as the same data and information even though the formats (for example, a text format, a binary format, a flag format and the like) are changed for each computer, inasmuch as they are recognized as the same semantic content. For example, the information representing 'two' may be kept as information of a text format "0x32", which is the ASCII code, in one computer and may be kept as information of a binary format "10", which is the binary representation, in another computer.

Also, in this disclosure, the 'data' and 'information' before and after a predetermined calculation is applied thereto may be handled as the same data and information. For example, it is assumed that unencrypted key information is stored in the storage and encrypted key information (hereinafter, referred to as 'encryption key information') is received through the communication interface 25. In this case, when the key information stored in the storage coincides with decrypted key information obtained by decrypting the encryption key information, the key information, the encryption key information and the decrypted key information may be handled as the same 'key information'. In the meantime, the 'predetermined calculation' is not limited to the encryption/decryption and may be a calculation using a Hash function, for example.

However, the distinction of the 'data' and 'information' is not strict, and exceptional handling is also allowed. For example, the data may be temporarily handled as the information, and the information may be temporarily handled as the data. Also, one that is handled as the data in an apparatus may be handled as the information in another apparatus. Further, the information may be extracted from the data, and the data may be extracted from the information.

The storage 32 is configured by a random access memory (hereinafter, also referred to as RAM), a read only memory (hereinafter, also referred to as ROM), an electrically erasable programmable read-only memory (hereinafter, also referred to as EEPROM), a hard disk drive (hereinafter, also referred to as HDD), a buffer memory provided for the CPU 31 or a combination thereof.

The storage 32 may be a computer-readable storage medium. The computer-readable storage medium is a non-transitory medium. The non-transitory medium includes a recording medium such as a CD-ROM and a DVD-ROM, too. Also, the non-transitory medium is a tangible medium. In the meantime, an electric signal for carrying a program to be downloaded from a server and the like on the Internet is a computer-readable signal medium, which is one kind of the computer-readable medium, but is not included in the non-transitory computer-readable storage medium.

The program stored in the program storage area 32A is configured to be executed by the CPU 31. However, in this disclosure, the operations of each program may be described while omitting the CPU 31. That is, in below descriptions, the description 'program A is configured to execute processing A' may convey the meaning 'CPU 31 is configured to execute processing A described in the program A'. This is also the same for the portable device 50 and server apparatus 70, which will be described later.

The OS 34 is a basic program for providing an API (abbreviation of Application Programming Interface) configured to control the printer unit 11, the scanner unit 12, the display 23, the user interface 24, the communication interface 25 and the like, which are the hardware configuring the multi function device 10. That is, each program described above is configured to call the API provided by the OS 34, thereby controlling the respective hardware. However, in this disclosure, the operations of each program are described while omitting the OS 34. That is, in below descriptions, the description 'program B is configured to control hardware C' may convey the meaning 'program B is configured to control hardware C through the API of the OS 34'. This is also the same for the portable device 50 and server apparatus 70, which will be described later.

Figure 2B:
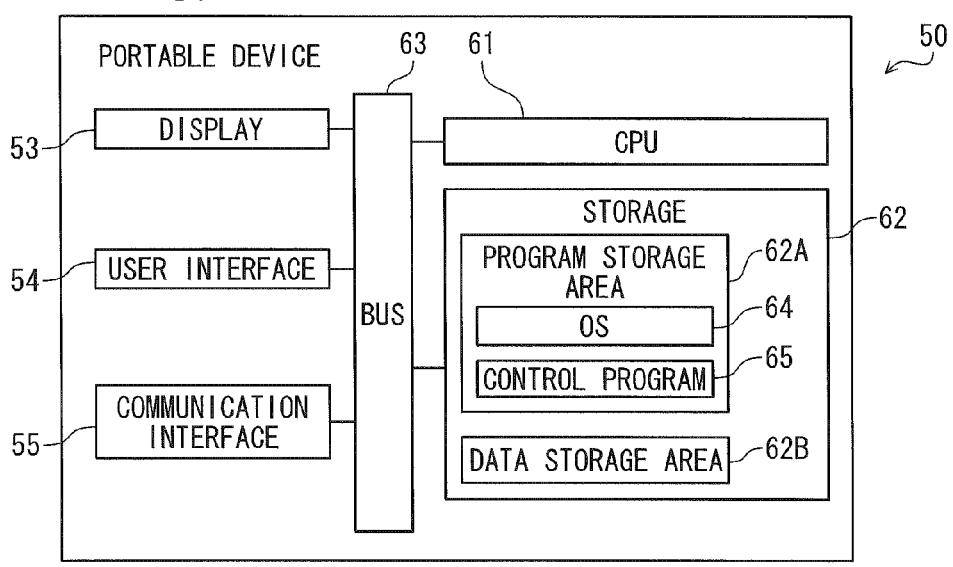

As shown in FIG. 2B, the portable device 50 mainly has a display 53, a user interface 54, a communication interface 55, a CPU 61, a storage 62 and a communication bus 63. Since the display 53, the user interface 54, the communication interface 55, the CPU 61, the storage 62 and the communication bus 63, which are included in the portable device 50, are common to the display 23, the user interface 24, the communication interface 25, the CPU 31, the storage 32 and the communication bus 33, which are included in the multi function device 10, the overlapping descriptions are omitted. The CPU 61 and the storage 62 configure an example of the control unit. The portable device 50 is an example of the information processing apparatus. However, the specific example of the information processing apparatus is not limited to the portable device 50 such as a smart phone, a portable phone and a tablet terminal, and may be a personal computer (hereinafter, also referred to as PC) and the like.

The communication interface 55 is configured to perform communication with the multi function devices 10A, 10B, 10C belonging to the LAN 102 and to perform communication with the server apparatus 70 connected to the Internet 101 via the router 102A. That is, the portable device 50 is configured to transmit a variety of data or information to the multi function device 10 or server apparatus 70 through the communication interface 55 and to receive the variety of data or information from the multi function device 10 or server apparatus 70 through the communication interface 55.

The data storage area 62B of the storage 62 can store therein a cooperation operation list. The cooperation operation list is a list for defining a cooperation operation of enabling a first apparatus to execute a first operation and a second apparatus to execute a second operation after the first operation. For example, as shown in FIGS. 8A and 8B, in the cooperation operation list, a first apparatus and a second apparatus selected from a plurality of apparatuses are associated with execution sequences of operations to be executed by the apparatuses, apparatus IDs for identifying the apparatuses, operation contents to be executed by the apparatuses, and progressing statuses of operations to be executed by the apparatuses. The cooperation operation list is an example of the cooperation operation information. Also, the corresponding apparatus ID and operation content are examples of the operation information.

Meanwhile, in the cooperation operation list shown in FIGS. 8A and 8B, a cooperation operation including a plurality of first operations and one second operation is defined. However, the numbers of the first operations and second operations included in the cooperation operation are not limited to the examples of FIGS. 8A and 8B. That is, the first and second operations included in the cooperation operation may be one or more. In other words, the cooperation operation may include one or more first operations and one or more second operations.

In the cooperation operation list shown in FIGS. 8A and 8B, the server apparatus 70 identified with an apparatus ID "server A", the multi function device 10A identified with an apparatus ID "MFC-A" and the multi function device 10B identified with an apparatus ID "MFC-B" are examples of the first apparatus configured to execute the first operation. Also, the multi function device 10C identified with an apparatus ID "MFC-C" is an example of the second apparatus configured to execute the second operation. The first operation is an operation including transmission of target data to the portable device 50. The second operation is an operation including reception of target data from the portable device 50.

For example, the operation content "DL" associated with the server apparatus 70 indicates a first operation of transmitting target data 1 stored in the server apparatus 70 to the portable device 50. The operation content "SCAN" associated with the multi function devices 10A, 10B indicates a second operation of enabling the scanner unit 12 to execute the scan processing and transmitting target data 2, 3 generated in the scan processing to the portable device 50. The operation content "PRINT" associated with the multi function device 10C indicates a second operation of receiving target data 1 to 3 from the portable device 50 and enabling the printer unit 11 to execute recording processing of the target data 1 to 3.

In the meantime, although not shown, the operation contents included in the cooperation operation list may include more detailed content (hereinafter, referred to as 'setting information'). For example, the operation content "DL" may be added with a data ID of the target data, which is a downloading target, and the like. Also, the operation content "SCAN" may be added with a document size indicating a size of a document, information indicating a color scan or monochrome scan, information indicating a duplex scan or one-sided scan, and the like. Further, the operation content "PRINT" may be added with information indicating a size of a recording sheet, information indicating a number of sheets to be printed, information indicating a number of images to be included on one recording sheet, information indicating a duplex print or one-sided print, and the like.

Regarding the progressing status, one of "operation standby" indicating that a corresponding operation has not started yet, "under operation" indicating that a corresponding operation is being executed, and "operation completed" indicating that communication with the portable device 50 of a corresponding operation has been completed is set. The values that can be set as regards the progressing status will be described later.

The cooperation operation list can be arbitrarily prepared and edited by the user of the portable device 50. The portable device 50 may receive new registration and editing of the cooperation operation list by the user through the display 53 and the user interface 54, for example. A specific operation method of the new registration and editing of the cooperation operation list is omitted. Also, a plurality of the cooperation operation lists can be stored in the data storage area 62B. For this reason, the cooperation operation list stored in the data storage area 62B is assigned a cooperation operation ID for identifying the cooperation operation list.

Also, the data storage area 62B can store therein registered operation information. As shown in FIG. 9, in the registered operation information, an apparatus ID and an operation content of an operation to be executed by an apparatus identified with the apparatus ID are associated. In the meantime, the registered operation information shown in FIG. 9A includes apparatus IDs of apparatuses becoming the first apparatus and operation contents of the first operation. Also, the registered operation information shown in FIG. 9B includes apparatus IDs of apparatuses becoming the second apparatus and operation contents of the second operation. In the meantime, the registered operation information can be arbitrarily prepared and edited by the user of the portable device 50, like the cooperation operation list.

The server apparatus 70 is a storage server configured to store therein data, for example. Although the specific example of the server apparatus 70 is not particularly limited, the server apparatus 70 is an apparatus configured to provide services such as 'Dropbox (registered trademark of Dropbox, Inc.)', 'Google Drive (registered trademark of Google Inc.)', 'Evernote (registered trademark of Evernote Corporation)' and the like. Also, the present disclosure is not limited to the configuration where the server apparatus 70 is connected to the Internet 101, and the server apparatus 70 may be a local storage server belonging to the LAN 102.

Figure 5B:
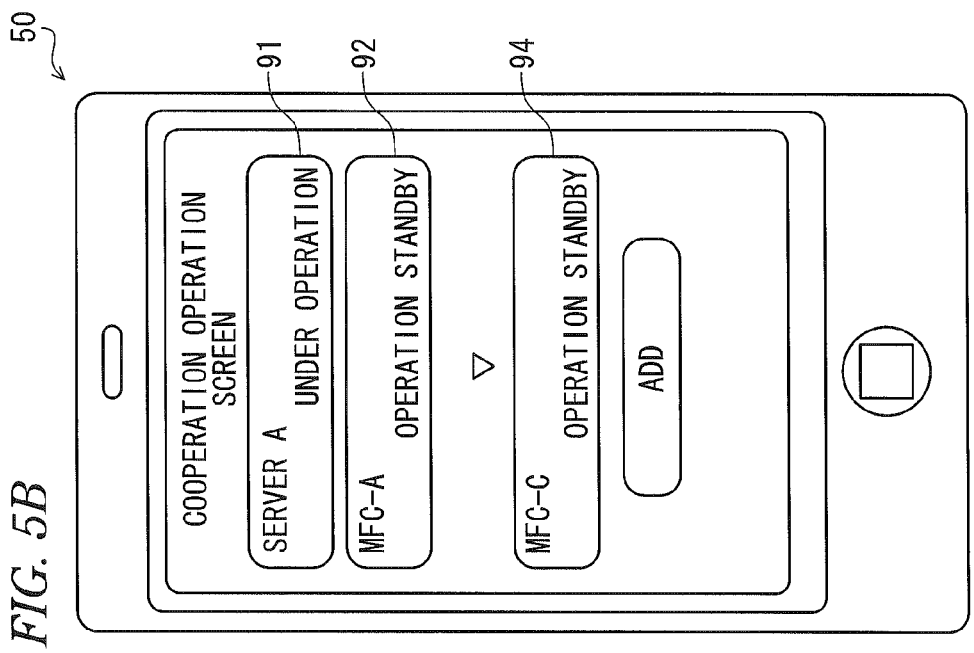
Figure 5A:
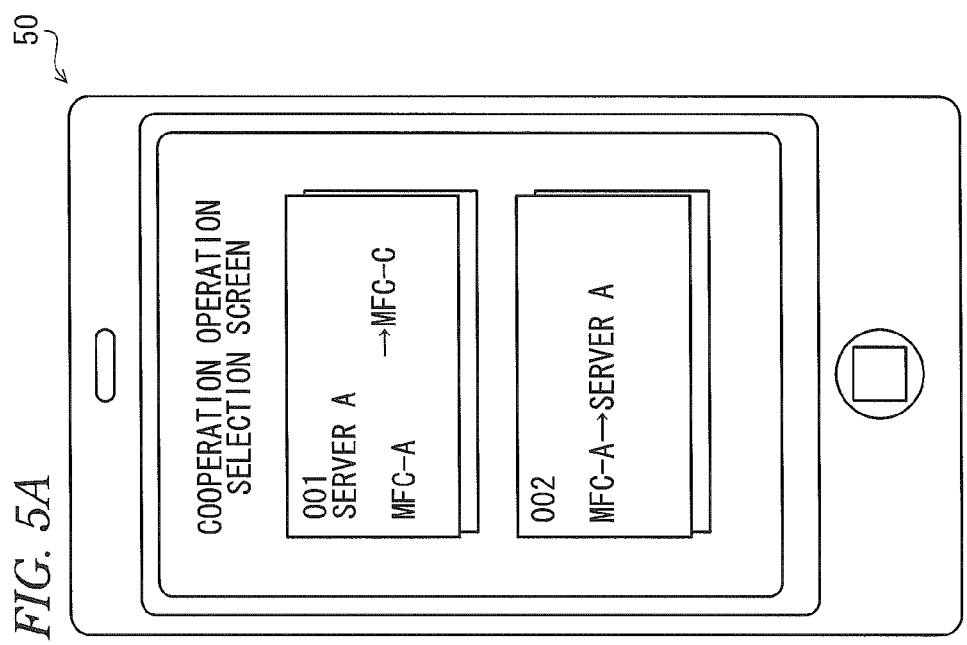

Operations of the cooperation system 100 are described with reference to FIGS. 3 to 9. First, a basic flow of the cooperation operation that is controlled by the portable device 50 is described with reference to FIG. 3. The control program 65 of the portable device 50 displays a cooperation operation selection screen on the display 53 (S10). FIG. 5A illustrates an example of the cooperation operation selection screen. The cooperation operation selection screen shown in FIG. 5A includes one or more cooperation operation icons. The cooperation operation icon is denoted with a cooperation operation ID for identifying the cooperation operation list stored in the data storage area 62B.

When the user interface 54 receives a user's operation of tapping a position of the cooperation operation icon (S12: Yes), the control program 65 reads out a cooperation operation list identified with the cooperation operation ID denoted at the cooperation operation icon from the data storage area 62B (S13). The processing of step S12 is an example of the reception processing of receiving a start instruction to start the cooperation operation. Also, the processing of step S12 is an example of the reception processing of receiving a selection instruction to select the cooperation operation identification information and the start instruction. Further, the processing of step S13 is an example of the acquisition processing.

Also, the control program 65 displays a cooperation operation screen on the display 53 (S14). FIGS. 5B and 7A illustrate examples of the cooperation operation screen of the illustrative embodiment. The cooperation operation screens shown in FIGS. 5B and 7A include status images 91, 92, 93, 94 corresponding to the first apparatuses and second apparatus included in the cooperation operation list acquired in step S13, and an "ADD" icon for adding a new operation to the cooperation operation. The processing of step S14 is an example of the display control processing. The cooperation operation screen is an example of the status screen. The "ADD" icon is an example of the adding instruction object for receiving an instruction to add a new operation to the cooperation operation.

In the status images 91 to 94, the apparatus IDs included in the cooperation operation list and progressing statuses associated with the apparatus IDs are indicated. That is, the information indicated in the status images 91 to 94 is changed as the cooperation operation progresses. More specifically, the progressing statuses indicated in the status images 91 to 94 shown in FIGS. 5B and 7A correspond to the progressing statuses included in the cooperation operation list shown in FIGS. 9A and 9B. Also, the status images 91 to 94 are arranged in accordance with the execution sequences of the cooperation operation list.

In the cooperation operation screens shown in FIGS. 5B and 7A, the status image 91 represents a progressing status of the first operation that is to be executed by the server apparatus 70 identified with the apparatus ID "server A". The status image 92 represents a progressing status of the first operation that is to be executed by the multi function device 10A identified with the apparatus ID "MFC-A". The status image 93 represents a progressing status of the first operation that is to be executed by the multi function device 10B identified with the apparatus ID "MFC-B". The status image 94 represents a progressing status of the second operation that is to be executed by the multi function device 10C identified with the apparatus ID "MFC-C".

Then, the control program 65 enables each of the first apparatuses to execute the first operation in accordance with the execution sequence indicated in the cooperation operation list (S15 to S21). Specifically, the control program 65 initializes a parameter m (S15). Then, the control program 65 transmits operation instruction information to the first apparatus of which execution sequence indicated in the cooperation operation list is m-th, through the communication interface 55 (S16). Also, the control program 65 changes the progressing status of the m-th first apparatus from "operation standby" to "under operation" in the cooperation operation list and the status image (S17). The operation instruction information is information for enabling a transmission destination apparatus to execute a corresponding operation. The processing of step S16 and step S24 is an example of the operation instruction processing. The details of the operation instruction processing will be described later.

Then, the control program 65 holds execution of subsequent processing until transmission completion information is received from the m-th first apparatus through the communication interface 55 (S18: No). Also, the control program 65 sequentially receives the target data, which has been divided into multiple data, from the first apparatus through the communication interface 55 and stores the same in the data storage area 62B until the transmission completion information is received from the first apparatus (S18: No).

The transmission completion information is information indicating that transmission of the target data to the portable device 50 of the first operation to be executed by the first apparatus is completed. That is, when the transmission completion information is received from the first apparatus through the communication interface 55, the control program 65 determines that the reception of the target data from the first apparatus is completed. Although the specific example of the transmission completion information is not particularly limited, it may be a packet in which "ON" is set for a FIN flag of a transmission control protocol (hereinafter, also referred to as TCP) header, for example.

Subsequently, when the transmission completion information is received from the m-th first apparatus through the communication interface 55 (S18: Yes), the control program 65 changes the progressing status of the first apparatus from "under operation" to "operation completed" in the cooperation operation list and the status image (S19). Then, when the first operation not executed yet is included in the cooperation operation list (S20: Yes), the control program 65 increments the parameter m by 1 (one) (S21) and again executes the processing of steps S16 to S19.

When all the first operations registered in the cooperation operation list are executed (S20: No), the control program 65 hides a first operation adding icon (which will be described later) (S22). Subsequently, the control program 65 enables each of the second apparatuses to execute the second operation in accordance with the execution sequence indicated in the cooperation operation list (S23 to S29). Since the processing of step S23 to S29 is substantially common to the processing of steps S15 to S21, the detailed descriptions thereof are omitted and the differences are described.

The control program 65 sequentially transmits the target data, which has been divided into multiple data, to the n-th second apparatus through the communication interface 55 until reception completion information is received from the second apparatus of which execution sequence indicated in the cooperation operation list is n-th, through the communication interface 55 in step S26. The reception completion information is information indicating that the reception of the target data from the portable device 50 of the second operation is completed. That is, when the reception completion information is received from the second apparatus through the communication interface 55, the control program 65 determines that the transmission of the target data to the second apparatus is completed. Although the specific example of the reception completion information is not particularly limited, it may be a packet in which "ON" is set for a FIN flag and an ACK flag of a TCP header, for example.

Also, for example, the control program 65 combines the plurality of target data received in steps S16 to S21, which are iteratively executed, and transmits the combined target data in steps S24 to S29, which are iteratively executed. That is, when a plurality of second operations is included in the cooperation operation, the control program 65 of this illustrative embodiment transmits the same target data to each of the second apparatuses, for example. However, it should be noted that a relation between the target data to be received from the first apparatus and the target data to be transmitted to the second apparatus is not limited to the above example.

Figure 3:
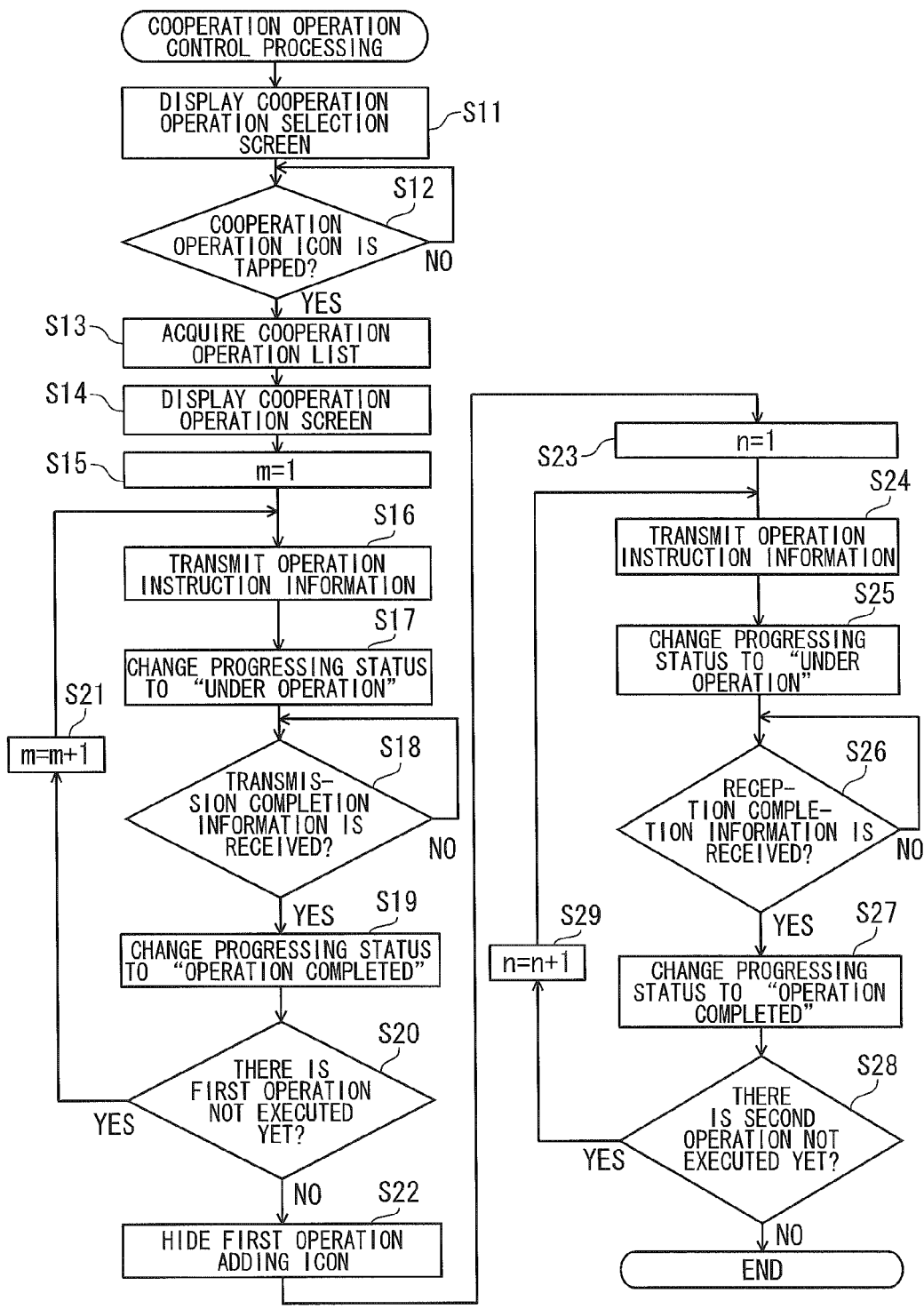
FIG. 3 is a flowchart of cooperation operation control processing that is executed by a control program 65 of the portable device 50.
Figure 4:
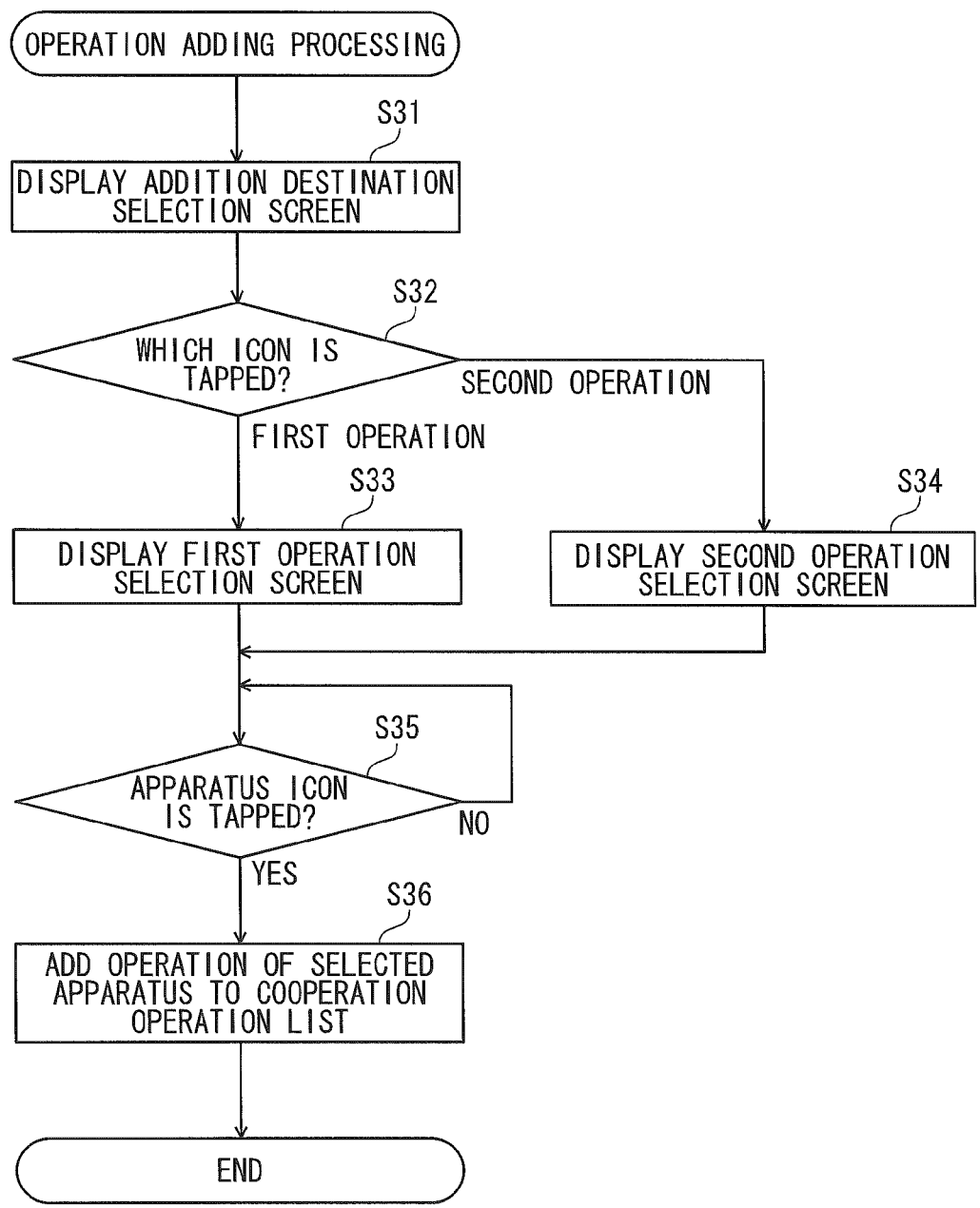
FIG. 4 is a flowchart of operation adding processing that is executed by the control program 65 of the portable device 50.

When the user interface 54 receives a user's operation of tapping a position of the "ADD" icon during the execution of the cooperation operation described with reference to FIG. 3, the portable device 50 of this illustrative embodiment executes operation adding processing of adding a new operation to the cooperation operation. The operation adding processing is described in detail with reference to FIG. 4. In the below, processing, which is executed when the position of the "ADD" icon is tapped at a state where the cooperation operation screen shown in FIG. 5B is displayed on the display 53 and the cooperation operation list shown in FIG. 8A is stored in the data storage area 62B, is described.

In the cooperation operation list shown in FIG. 8A, the cooperation operation including the first operation "DL", which is to be executed by the first apparatus "server A", the first operation "SCAN", which is to be executed by the first apparatus "MFC-A", and the second operation "PRINT", which is to be executed by the second apparatus "MFC-C", is defined. Also, the cooperation operation screen shown in FIG. 5B and the cooperation operation list shown in FIG. 8A show that the first apparatus "server A" is executing the first operation "DL."

Figure 6A:
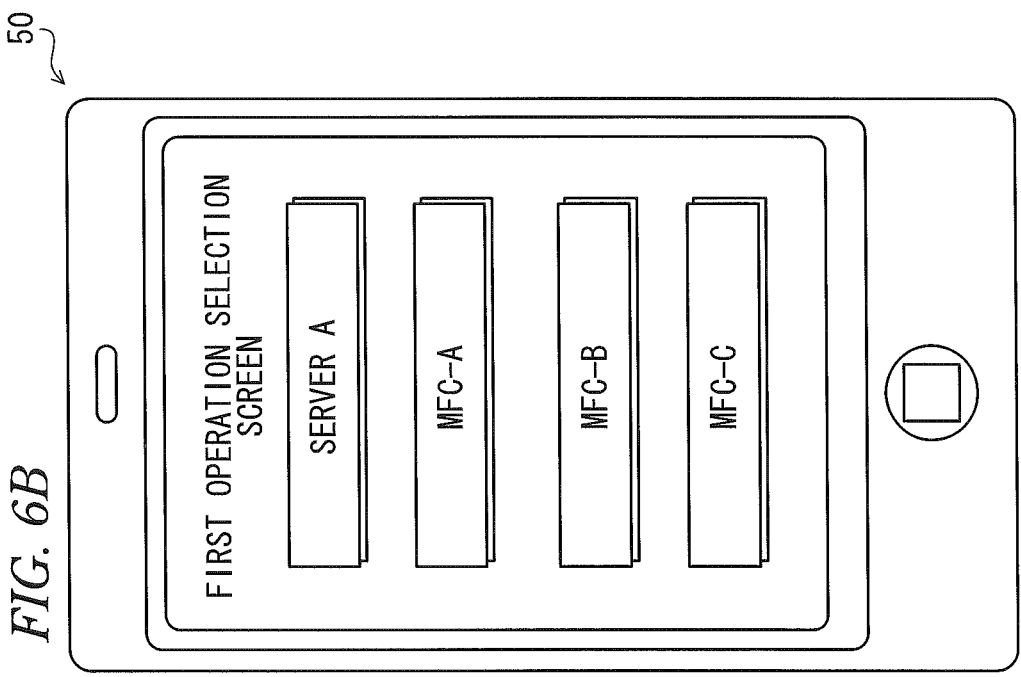

First, when the user interface 54 receives a user's operation of tapping the position of the "ADD" icon on the cooperation operation screen shown in FIG. 5A, the control program 65 displays an addition destination selection screen rather than the cooperation operation screen on the display 53 (S31). FIG. 6A illustrates an example of the addition destination selection screen. The addition destination selection screen shown in FIG. 6A includes a "+first operation" icon and a "+second operation" icon. The "+first operation" icon is an example of the first operation adding instruction object for receiving an instruction to add the first operation. The "+second operation" icon is an example of the second operation adding instruction object for receiving an instruction to add the second operation.

Figure 6B:
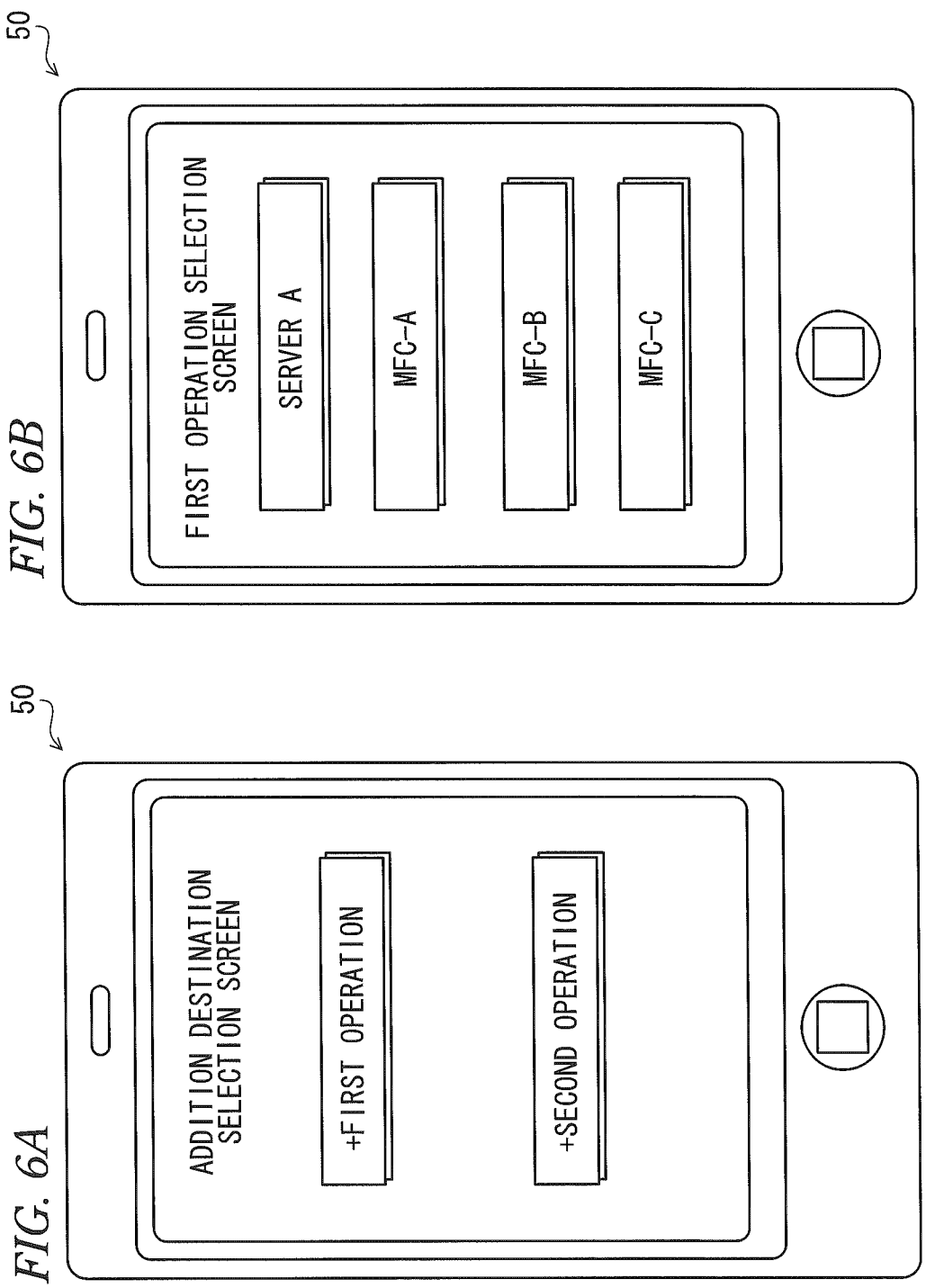

Then, when the user interface 54 receives a user's operation of tapping a position of the "+first operation" icon (S32: first operation), the control program 65 displays a first operation selection screen, instead of the addition destination selection screen, on the display 53 (S33). FIG. 6B illustrates an example of the first operation selection screen including a list of the apparatus IDs for identifying apparatuses capable of executing the first operation. The first operation selection screen shown in FIG. 6B includes one or more apparatus icons. In FIG. 6B, a "server A" icon, an "MFC-A" icon, an "MFC-B" icon and an "MFC-C" icon are examples of the apparatus icon. The control program 65 of the illustrative embodiment adds the apparatus icons, which are denoted with the apparatus IDs included in the registered operation information shown in FIG. 9A, to the first operation selection screen.

On the other hand, when the user interface 54 receives a user's operation of tapping a position of the "+second operation" icon (S32: second operation), the control program 65 of the illustrative embodiment displays a second operation selection screen, instead of the addition destination selection screen, on the display 53 (S35). The second operation selection screen is an example of the first operation selection screen including a list of apparatus IDs for identifying apparatuses capable of executing the first operation. The control program 65 of the illustrative embodiment adds the apparatus icons, which are denoted with the apparatus IDs included in the registered operation information shown in FIG. 9B, to the second operation selection screen. Since a layout of the second operation selection screen is common to the first operation selection screen, the illustration thereof is here omitted. In the present disclosure, the first operation selection screen and the second operation selection screen may be collectively referred to as an 'operation selection screen.'

Then, when the user interface 54 receives a user's operation of tapping one position of the apparatus icons (S35: Yes), the control program 65 adds the registered operation information including the apparatus ID denoted at the apparatus icon to the cooperation operation list (S36). In this illustrative embodiment, the control program 65 adds the registered operation information including the apparatus ID "MFC-B" and the operation content "SCAN" to a predetermined position of the cooperation operation list, as shown in FIG. 8B. The registered operation information added to the cooperation operation list is an example of the added operation information.

In the illustrative embodiment, the control program 65 adds the registered operation information to the cooperation operation list so that the first operation "SCAN" of the first apparatus "MFC-B" selected by the user is executed after all the first operations and before the second operation, as shown in FIG. 8B. In the example of FIG. 8B, the multi function device 10B identified with the apparatus ID "MFC-B" is an example of the added apparatus and the operation indicated by the operation content "SCAN" is an example of the added operation. Also, the control program 65 displays the cooperation operation screen in which the status image 93 is newly included, as shown in FIG. 7A, on the display 53, instead of the first operation selection screen.

Figure 7B:
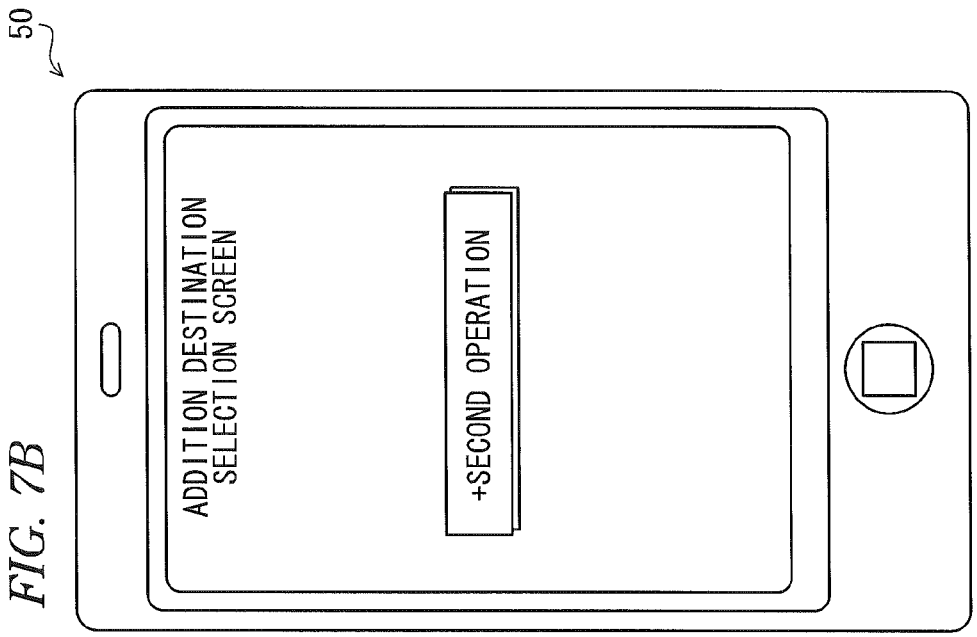
Figure 7A:
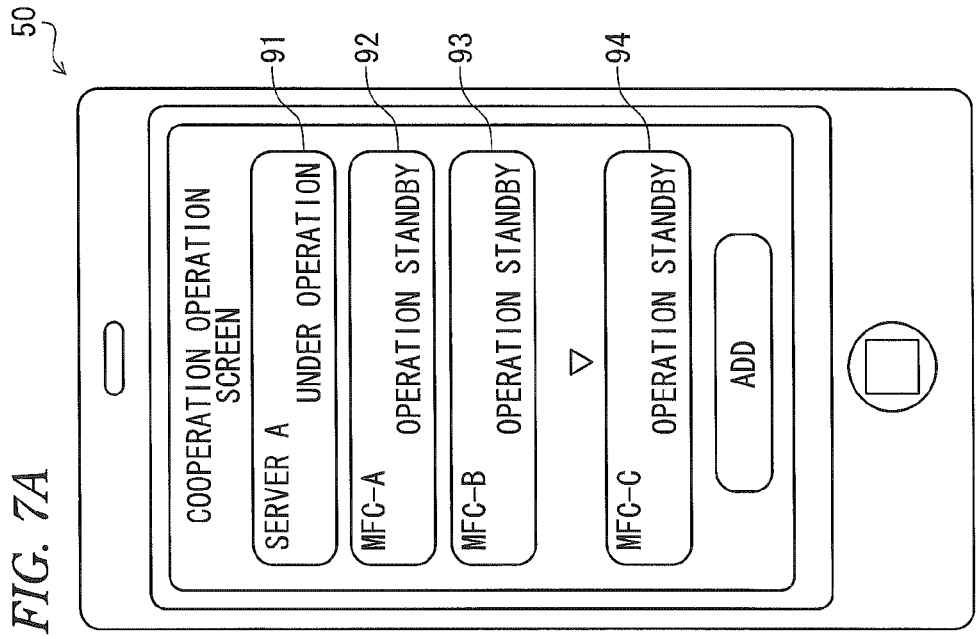

When the user interface 54 receives a user's operation of tapping the position of the "ADD" icon on the cooperation operation screen after the reception of the transmission completion information from all the first apparatuses, the control program 65 displays an addition destination selection screen shown in FIG. 7B on the display 53. The addition destination selection screen shown in FIG. 7B is different from the addition destination selection screen shown in FIG. 6A, in that the "+first operation" icon is omitted.

That is, the "+first operation" icon of the illustrative embodiment can be selected until the transmission completion information is received from all the first apparatuses, i.e., until the reception of the target data from all the first apparatuses is completed. In the meantime, the "+second operation" icon of the illustrative embodiment can be selected until the transmission completion information is received from all the second apparatuses, i.e., until the transmission of the target data to all the second apparatuses is completed, in other words, until the cooperation operation control processing is completed.

According to the above illustrative embodiment, after the cooperation operation starts, the first operation can be added until the reception of the target data from all the first apparatuses is completed, and the second operation can be added until the transmission of the target data to all the second apparatuses is completed. As a result, it is possible to easily add an operation necessary for the cooperation operation. If the first apparatus is added after the second operation starts, there is a possibility that a second apparatus incapable of receiving target data received from the added first apparatus in the second operation and a second apparatus capable of receiving the target data in the second operation will coexist. Therefore, it is preferable that the addition of the first operation is limited up to the completion of all the first operations, like the above configuration. In other words, when the reception of the target data from all the first apparatuses is completed, the "+first operation" icon is preferably switched from a selectable state to an unselectable state.

In the above illustrative embodiment, the first operation (hereinafter, referred to as 'added first operation') selected by the operation adding processing is added after all the first operations and before all the second operations, as shown in FIG. 8B. However, the execution sequence of the added first operation is not limited to the above example inasmuch as it is later than the first operation under execution and earlier than all the second operations at the time of the execution of the operation adding processing. For example, the added first operation may be added next to the first operation under execution at the time of the execution of the operation adding processing. As another example, the execution sequence of the added first operation in the operation adding processing may be designated by the user.

Likewise, the second operation (hereinafter, referred to as 'added second operation') selected by the operation adding processing may be executed after the second operation, when the second operation has already started after all the first operations. For example, the added second operation may be added after all the second operations. As another example, the added second operation may be added next to the second operation under execution at the time of the execution of the operation adding processing. Also, the execution sequence of the added second operation in the operation adding processing may be designated by the user.

Also, the cooperation operation control processing is executed in parallel even when the operation adding processing is being executed. That is, even while the addition destination selection screen, the first operation selection screen or the second operation selection screen is displayed on the display 53, the control program 65 receives the target data from the first apparatus or transmits the target data to the second apparatus. However, when the reception of the target data from all the first apparatuses is completed at a state where at least the first apparatus selection screen is displayed on the display 53, the control program 65 holds the subsequent processing. Then, when the instruction to add the first operation is received through the first operation selection screen, the control program 65 may enable the corresponding first apparatus to execute the first operation. In the meantime, when the addition of the first operation through the first operation selection screen is cancelled, the control program 65 may enable the corresponding second apparatus to execute the primary second operation.

Also, in the above illustrative embodiment, the "+first operation" icon is displayed on the addition destination selection screen when the position of the "ADD" icon is tapped before the reception of the target data from all the first apparatuses is completed, and is not displayed on the addition destination selection screen when the position of the "ADD" icon is tapped after the reception of the target data from all the first apparatuses is completed. In other words, the "+first operation" icon can be selected before the reception of the target data from all the first apparatuses is completed, and cannot be selected after the reception of the target data from all the first apparatuses is completed.

That is, in the above illustrative embodiment, when the "+first operation" icon is hidden, it cannot be selected. However, the method of disabling the "+first operation" from being selected is not limited thereto. That is, the corresponding icon may be displayed in an unselectable aspect such as a grayout on the addition destination selection screen. In the meantime, the description 'a state where an icon can be selected' conveys the meaning that the processing associated with the icon is executed by the tapping operation and the like, for example. In the meantime, the description 'a state where an icon cannot be selected' conveys the meaning that the processing associated with the icon is not executed by the tapping operation and the like, for example.

Also, according to the above illustrative embodiment, an operation to be added to the cooperation operation is selected from the registered operation information registered in advance in the data storage area 62B. Therefore, it is possible to suppress the decrease in the throughput of the cooperation operation, which is caused due to the execution of the operation adding processing. The method of selecting an operation, which can be added by the operation adding processing, is not limited to the above example.

For example, the control program 65 may be configured to execute retrieval processing of retrieving an apparatus connected to the communication network. In the retrieval processing, the control program 65 is configured to acquire the operation information indicating an apparatus ID of the retrieved apparatus and an operation content indicating an operation that can be executed by the apparatus. The control program 65 may be configured to add an apparatus icon denoted with an apparatus ID of an apparatus, which can execute the first operation, of the apparatuses retrieved in the retrieval processing, to the first operation selection screen. Likewise, the control program 65 may be configured to add an apparatus icon denoted with an apparatus ID of an apparatus, which can execute the second operation, of the apparatuses retrieved in the retrieval processing, to the second operation selection screen.

As described in the above, it is possible to select a desired operation from more options. Also, the control program 65 may be configured to store the apparatus ID and operation content retrieved in the retrieval processing or the apparatus ID and operation content selected through the operation selection screen in the data storage area 62B shown in FIG. 9. Further, processing of selecting desired operation information from the registered operation information stored in the data storage area 62B and processing of selecting desired operation information from the operation information acquired in the retrieval processing may be implemented independently of each other or may be combined.

Also, in the above illustrative embodiment, one of the cooperation operation lists registered in advance is selected on the cooperation operation selection screen, so that the cooperation operation is enabled to start. Thereby, an operation, which has not been considered upon the registration of the cooperation operation list, can be added to the cooperation operation after the cooperation operation starts. At this time, the input method of the start instruction and the acquisition method of the cooperation operation list are not limited to the above examples.

As an example, when the user interface 54 receives a user's operation of tapping a position of a start instruction icon (not shown) of the cooperation operation after the user interface 54 receives the user's operation of tapping the position of the cooperation operation icon in step S12, the control program 65 may start the cooperation operation. In this case, the processing of receiving the tapping operation two times and starting the cooperation operation is another example of the reception processing of receiving the selection instruction and the start instruction.

As another example, the selection of the first apparatus and the second apparatus, the selection of the operation to be executed by each apparatus, the designation of the execution sequence of each operation and the input of the start instruction may be performed on one screen. That is, the description 'the cooperation operation list is acquired' in step S13 of FIG. 3 conveys the meaning of reading out the cooperation operation list registered in advance from the data storage area 62B or acquiring the cooperation operation list from the user through the user interface 54.

The operation adding processing of a first modified embodiment is described with reference to FIG. 10. In the meantime, the common elements of the above illustrative embodiment are denoted with the same reference numerals, the descriptions thereof are omitted, and the differences are mainly described. The first modified embodiment is different from the above illustrative embodiment, in that "+" icons 95, 96 are included in the cooperation operation screen, instead of the "ADD" icon.

Figure 10A:
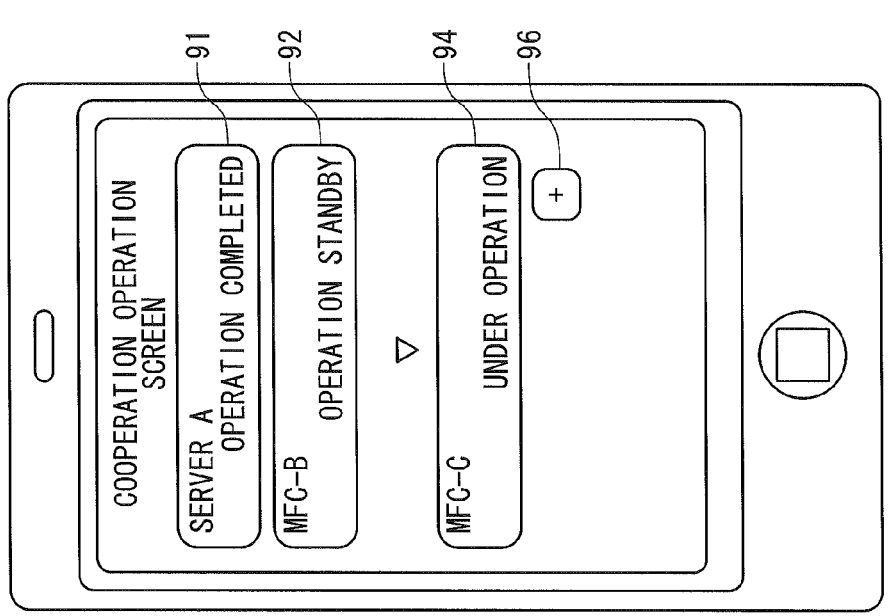

In the cooperation operation screen shown in FIG. 10A, the "+" icon 95 is an example of the first operation adding instruction object for receiving an instruction to add the first operation. Also, the "+" icon 96 is an example of the second operation adding instruction object for receiving an instruction to add the second operation. In this illustrative embodiment, the "+" icon 95 is arranged just below the status images 91, 92 corresponding to the first apparatus. Also, the "+" icon 96 is arranged just below the status image 94 corresponding to the second apparatus.

Figure 10B:
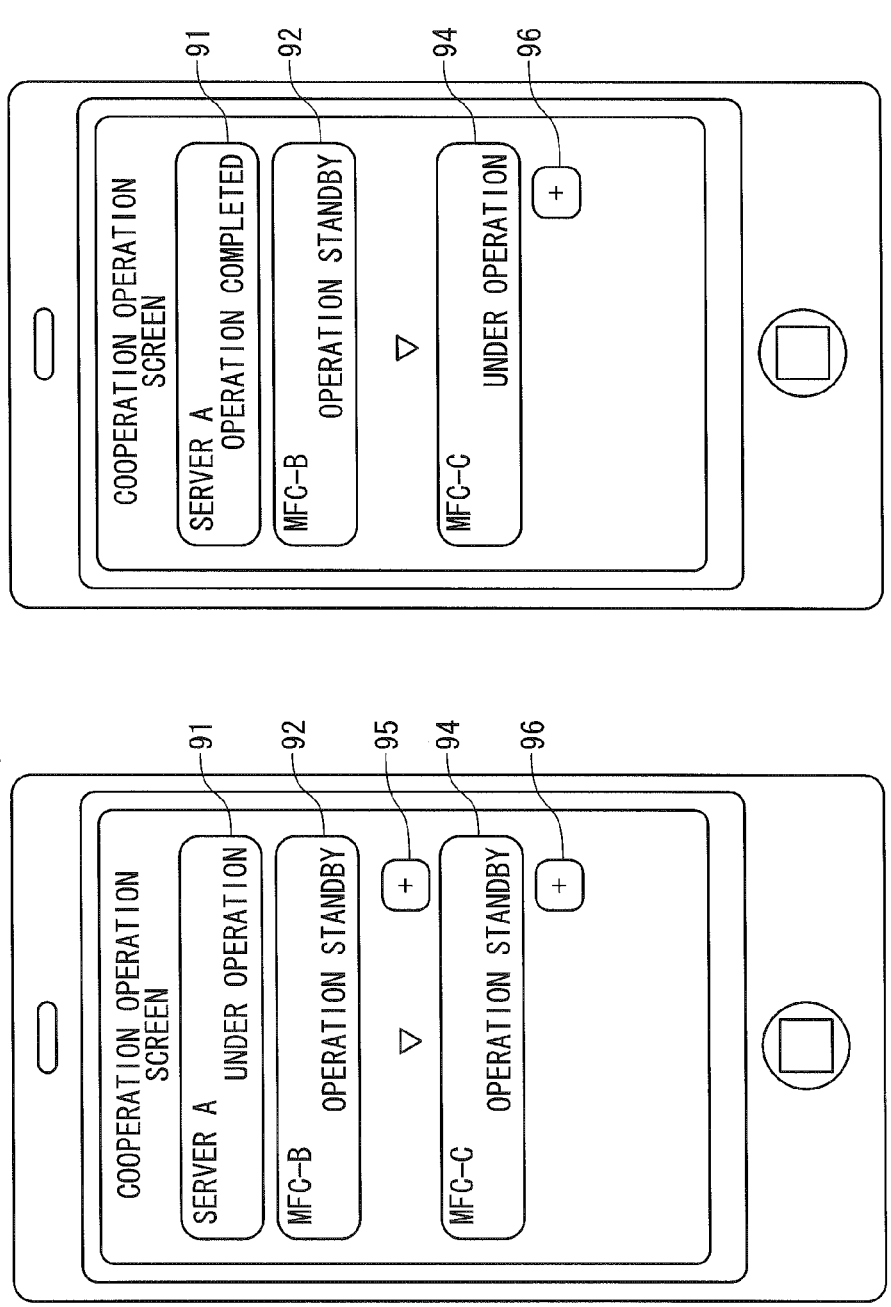

When the user interface 54 receives a user's operation of tapping a position of the "+" icon 95, the control program 65 displays the first operation selection screen shown in FIG. 6B on the display 53, instead of the cooperation operation screen. Also, when the user interface 54 receives a user's operation of tapping a position of the "+" icon 96, the control program 65 displays a second operation selection screen (not shown) on the display 53, instead of the cooperation operation screen. Further, when the reception of the target data from all the first apparatuses is completed, the control program 65 hides the "+" icon 95, as shown in FIG. 10B.

According to the first modified embodiment, since it is possible to directly transition to the operation selection screen from the cooperation operation screen while omitting the addition destination selection screen, it is possible to simplify the operation to select an operation that is to be added to the cooperation operation. As a result, it is possible to implement the user interface capable of easily adding a necessary operation while suppressing the decrease in the throughput of the cooperation operation, which is caused due to the execution of the operation adding processing.

Figure 11A:
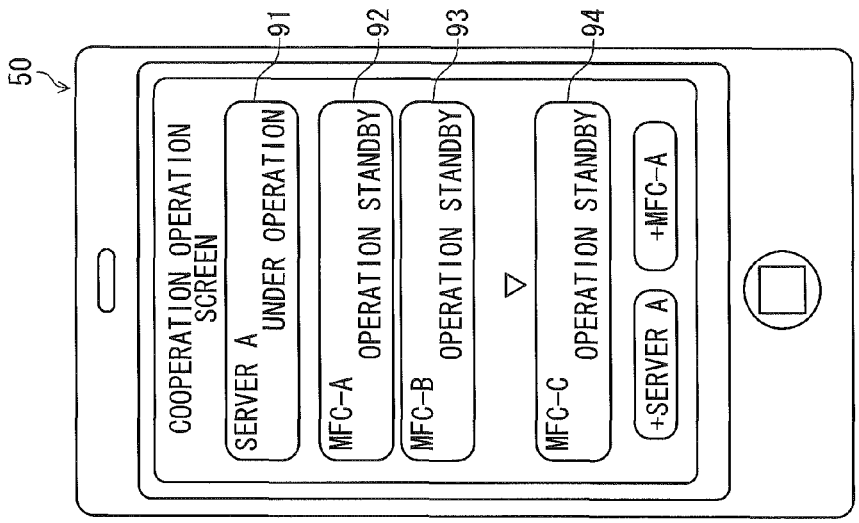

The operation adding processing of a second modified embodiment is described with reference to FIGS. 11A-11C. The common elements to the above illustrative embodiment are denoted with the same reference numerals, the descriptions thereof are omitted, and the differences are mainly described. The second modified embodiment is different from the above illustrative embodiment, in that a "+server A" icon and a "+MFC-A" icon are included in the cooperation operation screen, instead of the "ADD" icon.

The "+server A" icon is an example of the specific operation adding instruction object for receiving an instruction to add the operation information, which indicates the server apparatus 70 identified with the apparatus ID "server A" and an operation to be executed by the server apparatus 70, to the cooperation operation list. Also, the "+MFC-A" icon is another example of the specific operation adding instruction object for receiving an instruction to add the operation information, which indicates the multi function device 10A identified with the apparatus ID "MFC-A" and an operation to be executed by the multi function device 10A, to the cooperation operation list. The operation, which is to be added to the cooperation operation by selecting the "+server A" icon or "+MFC-A" icon, is an example of the specific operation. The specific operation, which is added by selecting the "+server A" icon or "+MFC-A" icon, is specified by the registered operation information shown in FIGS. 9A and 9B, for example. In the second modified embodiment, the specific operation adding instruction object included in the cooperation operation screen is designated from the registered operation information by the user, for example.

Figure 11B:
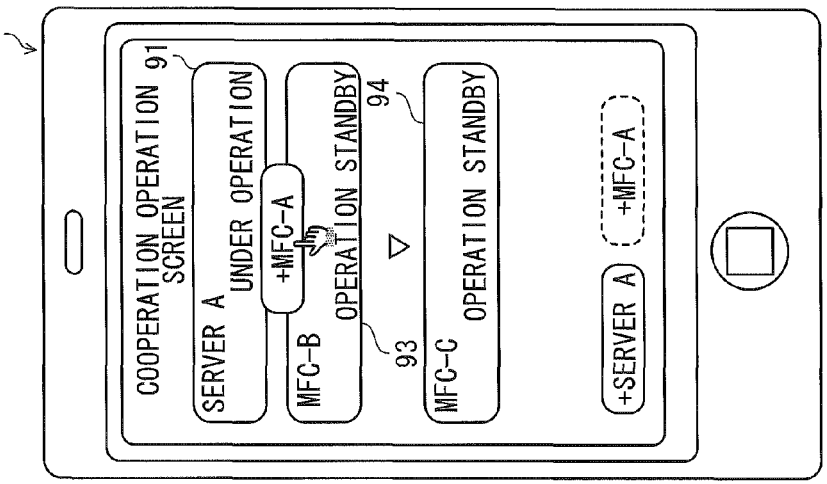
Figure 11C:
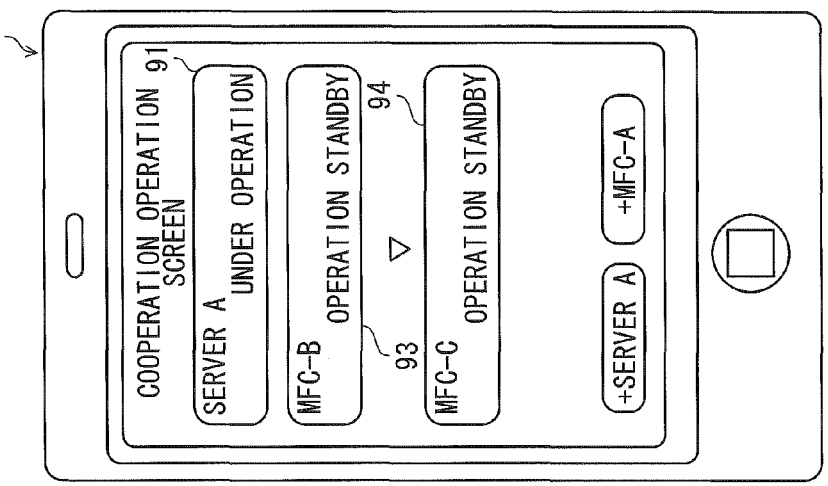

When the user interface 54 receives a user's operation of dragging the "+MFC-A" icon from a position of the "+MFC-A" icon to a position between the status images 91, 93, as shown in FIG. 11B, the control program 65 adds the operation information to the cooperation operation list so that an operation corresponding to the "+MFC-A" icon is executed between "DL" and "SCAN" corresponding to the status images 91, 93. Also, the control program 65 adds the status image 92 corresponding to the added operation between the status images 91, 93, as shown in FIG. 11C. In the second modified embodiment, the status image 91 is an example of the first status image, and the status image 93 is an example of the second status image.

According to the second modified embodiment, it is possible to select an operation, which the user wants to add, in the cooperation operation screen while omitting the addition destination selection screen and the operation selection screen. Also, it is possible to intuitively designate an execution sequence of the selected operation. As a result, it is possible to implement the user interface capable of easily adding a necessary operation while suppressing the decrease in the throughput of the cooperation operation, which is caused due to the execution of the operation adding processing.

The "drag" is an operation of touching the position of the "+MFC-A" icon with an input medium, sliding the touched input medium and separating the input medium from the display screen of the display 53 between the status images 91, 93. At this time, the using method of the second modified embodiment is not limited to the above example. For example, the processing of the second modified embodiment may be implemented by a combination of a user's operation of tapping the position of the "+MFC-A" icon and a user's operation of tapping a position to which an operation corresponding to the "+MFC-A" icon is to be added, i.e., a position between the status images 91, 93.

In the above illustrative embodiment, the variety of programs stored in the program storage area 32A, 62A of the storage 32, 62 of the multi function device 10 or portable device 50 are executed by the CPU 31, 61, so that the respective processing to be executed by the control unit of the present disclosure is implemented. However, the configuration of the control unit is not limited thereto, and a part or all of the configurations may be implemented by hardware such as IC (abbreviation of Integrated Circuit).

Further, the present disclosure can be implemented not only by the multi function device 10 or portable device 50 but also by a program configured to enable the multi function device 10 or portable device 50 to execute the processing. The program may be provided with being recorded in a non-transitory recording medium. The non-transitory recording medium may include a storage mounted to a server that can be connected to the multi function device 10 or portable device 50 through the communication network, in addition to a CD-ROM, a DVD-ROM and the like. The program stored in the storage of the server apparatus may be delivered through the communication network such as the Internet, as information or signal representing the program.

What is claimed is:

1. A non-transitory computer-readable recording medium storing computer-readable instructions for an information processing apparatus comprising a processor, a touch screen device including a display, a user interface that receives an operation by a user, and a communication interface that communicates with a plurality of apparatuses including a first apparatus and a second apparatus, the information processing apparatus being configured as a portable device, wherein the information processing apparatus performs a cooperation operation to instruct the first apparatus to execute a first operation and, after the first operation of the first apparatus is executed, to instruct the second apparatus to execute a second operation, the first operation of the first apparatus including transmitting target data to the information processing apparatus, the second operation of the second apparatus including receiving the target data from the information processing apparatus, wherein the computer-readable instructions, when executed by the processor, cause the information processing apparatus to perform:

receiving a start instruction by the user through the user interface to start the cooperation operation according to cooperation operation information selected from among a plurality of pieces of cooperation operation information stored in a storage device, wherein the cooperation operation information includes a plurality of pieces of apparatus identifying information for identifying a plurality of apparatuses and a plurality of pieces of operation information for identifying operations executed by each of the apparatuses identified by the apparatus identifying information, the cooperation operation information being an information identifying an executing sequence of the operations identified by the operation information, wherein the plurality of pieces of apparatus identifying information include a first apparatus identifying information for identifying the first apparatus and a second apparatus identifying information for identifying the second apparatus;

acquiring the cooperation operation information, from the storage device, which corresponds to the cooperation operation instructed by the start instruction received through the user interface;

starting, when determined that the start instruction is received, the cooperation operation by transmitting a plurality of pieces of operation instruction information for instructing execution of the operations by each of the apparatuses through the communication interface to each of the apparatuses according to the execution sequence of each of the operations included in the cooperation operation information;

controlling the display to display a status screen including an executing sequence list and an adding instruction object, wherein the executing sequence list indicates a plurality of apparatus objects being listed in an order identified by the executing sequence, wherein the apparatus objects include at least one of a name of each of the operations executed by each of the apparatuses, a progressing status indicator that indicates a progressing status of each of the operations executed by each of the apparatuses, wherein the apparatus objects include a first apparatus object corresponding to the first apparatus and a second apparatus object corresponding to the second apparatus, the adding instruction object being displayed to be selectable for receiving an adding instruction to add a new piece of cooperation operation information to the acquired cooperation operation information, the new piece of cooperation operation information including a piece of added apparatus identifying information for identifying an added apparatus by which an added operation is executed, and a piece of added operation information for identifying the added operation;

receiving, after starting the cooperation operation, the adding instruction by the user through the user interface by accepting a touch selection of the adding instruction object included in the apparatus objects; and adding, when determined that the adding instruction is received, the new piece of cooperation operation information to the acquired cooperation operation information, wherein, in adding the new piece of cooperation operation information to the acquired cooperation operation information, the computer-readable instructions cause the information processing apparatus to perform:

determining whether the added operation belongs to the first operation or to the second operation;

adding the new piece of cooperation operation information to the acquired cooperation operation information to be executed after the first operation is under execution and before the second operation when determined that the added operation belongs to the first operation;

adding the new piece of cooperation operation information to the cooperation operation information to be executed after the first operation and after the second operation under execution when determined that the added operation belongs to the second operation; and transmitting, to the added apparatus through the communication interface, the operation instruction information instructing the added apparatus to execute the added operation in the execution sequence indicated by the acquired cooperation operation information to which the new piece of cooperation operation information is added, wherein, in controlling the display to display the status screen, the computer-readable instructions cause the information processing apparatus to perform:

controlling the display to display the adding instruction object in the status screen to be selectable during a time period at least until a reception of the target data from the first apparatus is completed.

2. The non-transitory computer-readable recording medium according to claim 1, wherein, in controlling the display to display the status screen, the computer-readable instructions cause the information processing apparatus to perform:

controlling the display to display an addition destination selection screen in place of the status screen when determined that the adding instruction is received, the addition destination selection screen including a first operation adding instruction object and a second operation adding instruction object, the first operation adding instruction object being displayed to be selectable for receiving an instruction to add the first operation, the second operation adding instruction object being displayed to be selectable for receiving an instruction to add the second operation;

determining whether the first operation adding instruction object or the second operation adding instruction is selected;

controlling the display to display a first operation selection screen in place of the addition destination selection screen when determined that the first operation adding instruction object is selected, the first operation selection screen including a list of apparatus identification information for identifying the apparatuses capable of executing the first operation;

controlling the display to display a second operation selection screen in place of the addition destination selection screen when determined that the second operation adding instruction object is selected, the second operation selection screen including a list of apparatus identification information for identifying the apparatuses capable of executing the second operation;

receiving a touch selection of the apparatus identification information by the user through the user interface; and adding, when determined that the touch selection of the apparatus identification information is received, the new piece of cooperation operation information to the acquired cooperation operation information, the new piece of cooperation operation information indicating the added apparatus identified by the selected apparatus identification information and the added operation to be executed by the added apparatus.

3. The non-transitory computer-readable recording medium according to claim 2, wherein the apparatuses include a plurality of first apparatuses, wherein, in controlling the display to display the status screen, the computer-readable instructions cause the information processing apparatus to perform:

controlling the display to switch displaying the first operation adding instruction object from a selectable state to an unselectable state when determined that a reception of the target data from all the first apparatuses is completed.

4. The non-transitory computer-readable recording medium according to claim 2, wherein the information processing apparatus comprises a storage, and wherein the computer-readable instructions cause the information processing apparatus to perform:

storing registered operation information in the storage, the registered operation information indicating the apparatuses and the operations executed by the apparatuses;

including, in the first operation selection screen, an apparatus identification information of the apparatus that is capable of executing the first operation and being included in the registered operation information stored in the storage;

including, in the second operation selection screen, an apparatus identification information of the apparatus that is capable of executing the second operation and being included in the registered operation information stored in the storage; and adding, when determined that a selection of the apparatus identification information is received, the registered operation information including the apparatus identified by the selected apparatus identification information to the acquired cooperation operation information as the new piece of cooperation operation information.

5. The non-transitory computer-readable recording medium according to claim 2, wherein the information processing apparatus is connected to a communication network through the communication interface, and wherein the computer-readable instructions cause the information processing apparatus to perform:

retrieving the apparatuses connected to the communication network;

determining whether the first operation adding instruction object or the second operation adding instruction object is selected;

including, in the first operation selection screen, an apparatus identification information of the apparatus that is retrieved and is capable of executing the first operation when determined that the first operation adding instruction object is selected; and including, in the second operation selection screen, an apparatus identification information of the apparatus that is retrieved and is capable of executing the second operation when determined that the second operation adding instruction object is selected.

6. The non-transitory computer-readable recording medium according to claim 1, wherein the adding instruction object includes:

a first operation adding instruction object being displayed to be selectable for receiving an instruction to add the first operation; and a second operation adding instruction object being displayed to be selectable for receiving an instruction to add the second operation, wherein, in controlling the display to display the status screen, the computer-readable instructions cause the information processing apparatus to perform:

determining whether the first operation adding instruction object or the second operation adding instruction object is selected;

controlling the display to display a first operation selection screen in place of the status screen when determined that the first operation adding instruction object is selected, the first operation selection screen including a list of apparatus identification information for identifying the apparatuses capable of executing the first operation;

controlling the display to display a second operation selection screen in place of the status screen when determined that the second operation adding instruction object is selected, the second operation selection screen including a list of apparatus identification information for identifying the apparatuses capable of executing the second operation;

receiving a touch selection of the apparatus identification information by the user through the user interface; and adding, when determined that the touch selection of the apparatus identification information is received, the new piece of cooperation operation information to the acquired cooperation operation information, the new piece of cooperation operation information indicating the added apparatus identified by the selected apparatus identification information and the added operation to be executed by the added apparatus.

7. The non-transitory computer-readable recording medium according to claim 6, wherein the apparatuses include a plurality of first apparatuses, wherein, in controlling the display to display the status screen, the computer-readable instructions cause the information processing apparatus to perform:

controlling the display to switch displaying the first operation adding instruction object from a selectable state to an unselectable state when determined that a reception of the target data from all the first apparatuses is completed.

8. The non-transitory computer-readable recording medium according to claim 6, wherein the information processing apparatus comprises a storage, and wherein the computer-readable instructions cause the information processing apparatus to perform:

storing registered operation information in the storage, the registered operation information indicating the apparatuses and the operations executed by the apparatuses;

including, in the first operation selection screen, an apparatus identification information of the apparatus that is capable of executing the first operation and being included in the registered operation information stored in the storage;

including, in the second operation selection screen, an apparatus identification information of the apparatus that is capable of executing the second operation and being included in the registered operation information stored in the storage; and adding, when determined that the touch selection of the apparatus identification information is received, the registered operation information including the apparatus identified by the selected apparatus identification information to the acquired cooperation operation information as the new piece of cooperation operation information.

9. The non-transitory computer-readable recording medium according to claim 6, wherein the information processing apparatus is connected to a communication network through the communication interface, and wherein the computer-readable instructions cause the information processing apparatus to perform:

retrieving the apparatuses connected to the communication network;

determining whether the first operation adding instruction object or the second operation adding instruction object is selected;

including, in the first operation selection screen, an apparatus identification information of the apparatus that is retrieved and is capable of executing the first operation when determined that the first operation adding instruction object is selected; and including, in the second operation selection screen, an apparatus identification information of the apparatus that is retrieved and is capable of executing the second operation when determined that the second operation adding instruction object is selected.

10. The non-transitory computer-readable recording medium according to claim 1, wherein the user interface includes a touch sensor that receives a touch operation by the user to a display screen of the display, wherein the adding instruction object includes a specific operation adding instruction object for receiving an instruction to add, to the acquired cooperation operation information, the new piece of cooperation operation information indicating a specific apparatus and a specific operation to be executed by the specific apparatus, and wherein the computer-readable instructions cause the information processing apparatus to perform:

controlling the display to display the status screen including the specific operation adding instruction object and the apparatus objects that are arranged in accordance with the execution sequence indicated by the cooperation operation information;

receiving a slide operation by the user through the touch sensor in which the user slides the specific operation adding instruction object to a position between the first apparatus object and the second apparatus object that are arranged to be adjacent to each other; and adding, when determined that the slide operation is received, the new piece of cooperation operation information to the acquired cooperation operation information so that the specific operation is executed in the execution sequence between the operations represented by the first apparatus object and the second apparatus object.

11. The non-transitory computer-readable recording medium according to claim 1, wherein the information processing apparatus comprises a storage, and wherein the computer-readable instructions cause the information processing apparatus to perform:

storing a plurality of pieces of the cooperation operation information that is input by the user through the user interface in the storage in association with cooperation operation identification information that identifies each of the pieces of the cooperation operation information;

receiving a touch selection of the cooperation operation information by the user through the user interface; and acquiring the selected cooperation operation information from the storage.

12. The non-transitory computer-readable recording medium according to claim 1, wherein the apparatuses include a plurality of first apparatuses and a plurality of second apparatuses, and wherein the computer-readable instructions cause the information processing apparatus to perform:

transmitting the operation instruction information through the communication interface to the respective first apparatuses; and transmitting the operation instruction information through the communication interface to the respective second apparatuses when the target data is received from all of the first apparatuses.

* * * * *